United States Patent
Er et al.

(10) Patent No.: US 7,454,637 B2
(45) Date of Patent: Nov. 18, 2008

(54) VOLTAGE REGULATOR HAVING REDUCED DROOP

(75) Inventors: Kim Soi Er, Penang (MY); Yick Yaw Ho, Melaka (MY); Chuen Ming Tan, Penang (MY)

(73) Assignee: Intel Corporation, Santa Clara, CA (US)

( * ) Notice: Subject to any disclaimer, the term of this patent is extended or adjusted under 35 U.S.C. 154(b) by 378 days.

(21) Appl. No.: 11/218,363

(22) Filed: Sep. 2, 2005

(65) Prior Publication Data

US 2007/0055896 A1   Mar. 8, 2007

(51) Int. Cl.
*H01L 23/34* (2006.01)

(52) U.S. Cl. .................... 713/323; 713/300; 713/310; 713/320; 713/321; 713/322; 713/324; 713/330; 713/340; 257/691; 257/724

(58) Field of Classification Search ......... 713/300–340; 257/691, 724
See application file for complete search history.

(56) References Cited

U.S. PATENT DOCUMENTS

| | | | |
|---|---|---|---|
| 6,571,376 B1 | 5/2003 | Levin et al. | |
| 6,578,185 B1 * | 6/2003 | Kelly | 716/16 |
| 6,704,818 B1 * | 3/2004 | Martin et al. | 710/100 |
| 6,940,163 B2 | 9/2005 | Piorun et al. | |

* cited by examiner

*Primary Examiner*—Abdelmoniem Elamin
(74) *Attorney, Agent, or Firm*—Caven & Aghevli, LLC

(57) ABSTRACT

An on-die voltage regulator having a suspend mode voltage generator and an active mode voltage generator. Output drivers of the active mode voltage generator are disabled in stages to reduce voltage droop when transitioning between the active mode voltage generator and the suspend mode voltage generator.

18 Claims, 5 Drawing Sheets

VOLTAGE REGULATOR HAVING REDUCED DROOP

BACKGROUND

An on-die voltage regulator may regulate and supply voltage to a computer system in the range of, for example, 1.05 volts to 1.5 volts. In particular, an on-die voltage regulator may supply two kinds of power: active power and suspend power. The on-die voltage regulator may supply active power during an active mode in which a computing device is performing operations such as, for example, state S0 of version 2.0 of the ACPI (Advance Configuration and Power Interface) specification. Further the on-die voltage regulator may supply suspend power during a suspend mode such as, for example, states S3, S4, S5 of version 2.0 of the ACPI specification and/or a sleep mode in which power usage of the computing device may be reduced in comparison to the active mode. In response to the on-die voltage regulator transitioning between the active mode and the suspend mode, a voltage droop in the supplied voltage may occur and may adversely effect components that operate based upon the voltage supplied by the on-die voltage regulator.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

In the following detailed description, numerous specific details are described in order to provide a thorough understanding of the invention. However the present invention may be practiced without these specific details. In other instances, well known methods, procedures, components and circuits have not been described in detail so as not to obscure the present invention. Further, example sizes/models/values/ranges may be given, although the present invention is not limited to these specific examples.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
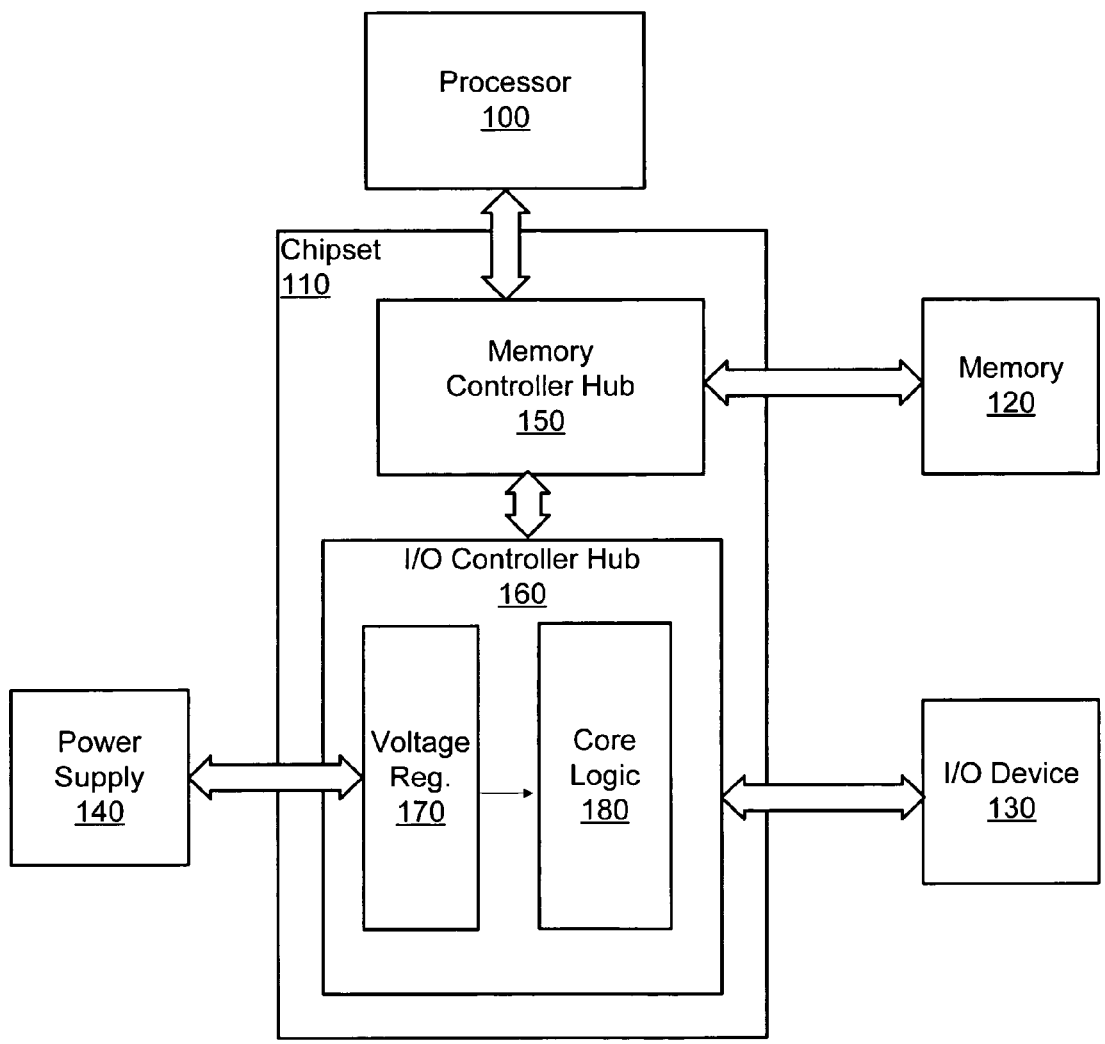
FIG. 1 illustrates an embodiment of computer system having an on-die voltage regulator.

Referring to FIG. 1, an embodiment of a computer system is shown. The computer system may include a processor 100, a chipset 110, a memory 120, an I/O device 130 and a power supply 140. As depicted, the processor 100 may be coupled with the chipset 110 via a processor bus. The memory 120 may be coupled with the chipset 110 via a memory bus. The I/O device 130 may be coupled with the chipset 110 via an I/O bus such as, for example, PCI (Peripheral Component Interconnect) buses, PCI Express buses, USB (Universal Serial Bus) buses, SATA (Serial Advanced Technology Attachment) buses, etc. The power supply 140 may be coupled with the chipset 110 through a supply interface.

The processor 100 may be implemented with an Intel® Pentium® 4 processor, Intel® Pentium® M processor, and/or another type of general purpose processor 100 capable of executing software and/or firmware instructions. In one embodiment, the processor 100 may execute instructions stored in the memory 120 to perform various tasks and to control the overall operation of the computer system. In particular, the processor 100 may execute instructions and/or routines related to power management tasks such as for example transitioning between active modes of operations and suspend modes of operation.

The chipset 110 may comprise one or more integrated circuits or chips to couple the processors 100 with other components of the computer system. As depicted, the chipset 110 may comprise a memory controller hub 150 and an I/O controller hub (ICH) 160. The memory controller hub 150 may provide an interface to memory devices of the memory 120. In particular, the memory controller hub 150 may generate signals on the memory bus to read and/or write data to memory devices of the memory 120 in response to requests from the processor 100 and I/O devices 130. The memory 120 may comprise for example RAM (Random Access Memory) devices such as source synchronous dynamic RAM devices and DDR (Double Data Rate) RAM devices.

The I/O controller hub 160 according to an embodiment may comprise an on-die voltage regulator 170 and core logic 180. The voltage regulator 170 may supply power to components of the I/O controller hub 160 such as, for example, the core logic 180 during an active mode and a suspend mode. The core logic 180 may implement basic I/O functions such as, for example, PCI (Peripheral Component Interconnect) interfaces, LPC (Low Pin Count) interfaces and other related I/O functions.

As depicted, the computer system may comprise I/O devices 130. The I/O device 130 may implement various input/output functions for the computer system. For example, the I/O device 130 may comprise hard disk drives, keyboards, mice, CD (compact disc) drives, DVD (digital video discs) drives, printers, scanners, etc.

Figure 2:
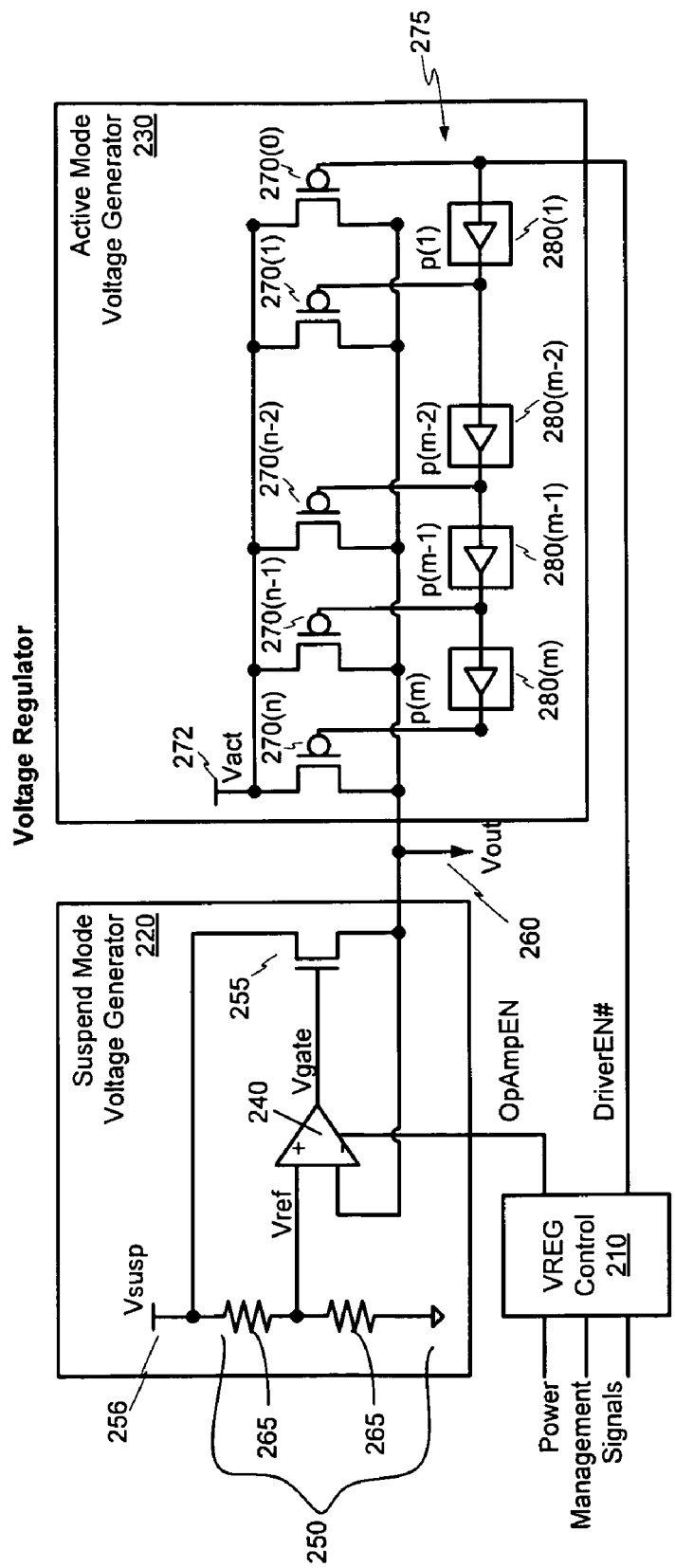
FIG. 2 illustrates an embodiment of the voltage regulator.

Referring now to FIG. 2, one embodiment of an on-die voltage regulator 170 is illustrated. As depicted the on-die voltage regulator 170 may comprise a voltage regulator control 210, a suspend mode voltage generator 220 and an active mode voltage generator 230. The voltage regulator control 210 may control transitioning between the active mode voltage generator 230 supplying an output voltage Vout and the suspend mode voltage generator 220 supplying the output voltage Vout. In particular, the voltage regulator 210 may cause the suspend mode voltage generator 220 to supply the output voltage Vout during a suspend mode and may cause the active mode voltage generator 230 to supply the output voltage Vout during an active mode.

The voltage regulator control 210 may receive power management signals and may instruct the suspend mode voltage generator 220 to supply an output voltage Vout or to stop supplying the output voltage Vout per a mode condition of the voltage regulator 170. During a suspend mode, the control 210 may enable a suspend mode voltage generator 220 to supply the output voltage Vout and may disable an active mode voltage generator 230 to cease supplying the output voltage Vout via the active mode voltage generator 230. During an active mode, the voltage regulator control 210 may disable the suspend mode voltage generator 220 to cease supplying the output voltage Vout via the suspend mode voltage generator 220 and may enable the active mode voltage generator 230 to supply the output voltage Vout.

The suspend mode voltage generator 220, as depicted may comprise an operational amplifier (Op Amp) 240, a voltage divider 250 coupled with the operational amplifier 240, and an output driver 255 coupled between a suspend mode voltage source 256 and an output voltage terminal 260. The voltage divider 250 according to an embodiment may comprise a plurality of resistors 265 coupled between the suspend mode voltage source 256 and ground. The voltage divider 250 may supply a reference voltage Vref to an input of the operational amplifier 240 that is between, for example, 1.5 volts and 1.05 volts.

In response to assertion of an operational amplifier enable signal OpAmpEn, the operational amplifier 240 in an embodiment may supply a voltage Vgate to a gate of a transistor of the output driver 255 to pull the output voltage terminal 260 up to the suspend mode voltage Vsusp supplied by the suspend mode voltage source 256. Conversely, in response to de-assertion of an operational amplifier enable signal OpAmpEn, the operational amplifier 240 may cease to supply the voltage Vgate to the gate of the output driver 255 to disable the output driver 255 and isolate the output voltage terminal 260 from the suspend mode voltage source 256. In one embodiment, the operational amplifier 240 may be implemented with a low power operational amplifier having a relatively slow slew rate. Accordingly, the operational amplifier 240 may take a substantial time (e.g. 200 nanoseconds) to frilly enable the output driver 255 in response to the operational amplifier enable signal OpAmpEn being activated.

As depicted. the active mode voltage generator 230 may comprise a plurality of output drivers 270(0) . . . 270($n$−1), 270($n$) such as, for example positive-channel metal oxide semiconductor (PMOS) transistors coupled between an active mode voltage source 272 and the output terminal 260. In response to the control 210 asserting a driver enable signal DriverEN#, the output drivers 270(0) . . . 270($n$−1), 270($n$) may pull up the output voltage terminal 260 to an active mode voltage Vact supplied by the active mode voltage source 272. Conversely, in response to the control 210 de-asserting the driver enable signal DriverEN#, the output drivers 270(0) . . . 270($n$−1), 270($n$) may isolate the output voltage terminal 260 from the active mode voltage source 272.

It should be noted that the hash symbol "#" used herein indicates the signal is activated by forcing the signal to a low value such as ground and the signal is de-activated by forcing the signal to a high value such as 1.5 volts. However, other embodiments may reverse the logic such that the signal is activated with a high value and de-activated with a low value. Further, other embodiments may use differential signaling to enable and disable components.

The active mode voltage generator 230 may further comprise a delay circuit 275. The delay circuit 275 may delay the driver enable signal DriverEn# such that the output drivers 270(0) . . . 270($n$−1), 270($n$) are disabled in stages. The output drivers 270(0) . . . 270($n$−1), 270($n$) may have a faster slew rate than the operational amplifier 240. Accordingly, if not delayed, the output drivers 270(0) . . . 270($n$−1), 270($n$) may turn off faster than the operational amplifier 240 is able to fully turn on the output driver 255 of the suspend mode voltage generator 220. This difference in slew rate may result in a droop in the output voltage Vout when transitioning between the active mode and the suspend mode. The delay circuit 275, therefore, may delay the driver enable signal DriverEn# such that the output drivers 270(0) . . . 270($n$−1), 270($n$) are disabled in a manner that compensates for the difference between the slew rates of the operational amplifier 240 and the output drivers 270 in an attempt to reduce voltage droop in the output voltage Vout. In one embodiment, the delay circuit 275 may ensure that the output voltage Vout does not droop below a reset value that would cause the computer system to reset. In another embodiment, the delay circuit 275 may maintain the output voltage Vout at a high value or may ensure that the output voltage Vout does not droop below a threshold level for a high value.

In one embodiment, the delay circuit 275 may comprise a plurality of serially connected delay elements or cells 280(1) . . . 280($m$−1), 280($m$) Each delay element 280(1) . . . 280($m$−1), 280($m$) may receive the delayed driver enable signal p($n$−1) of the previous delay element 280($n$−1), may introduce further delay, and may supply its further delayed driver enable signal p(n) to the next delay element 280($n$+1) in the chain of delay elements 280(1) . . . 280($m$−1), 280($m$) and to one or more of the plurality of output drivers 270($n$). Accordingly, the delay elements 280(1) . . . 280($m$−1), 280($m$) may introduce a different delay for each of a plurality of stages. In one embodiment, each stage corresponds to a single output driver 280 thus resulting in the output drivers 280(1) . . . 280($n$−1), 280($n$) being disabled one at a time. In other embodiments, stages may include one or more of the output drivers 280(1) . . . 280($n$−1), 280($n$), thus resulting in multiple output drivers of a single stage being disabled at the same time but output drivers of different stages being disabled at different times.

Figure 3:
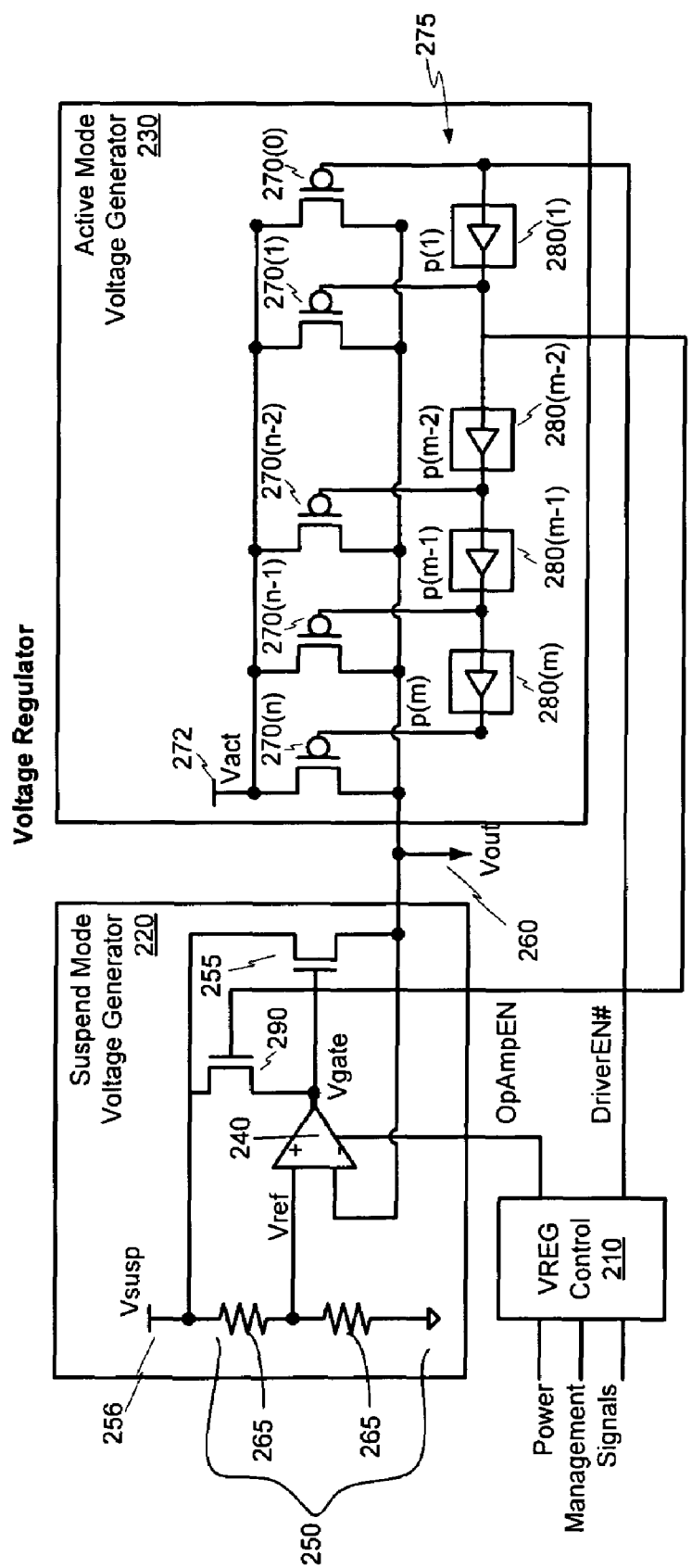
FIG. 3 illustrates another embodiment of the voltage regulator.

Reference is now made to FIG. 3 which depicts another embodiment of the voltage regulator 170. As depicted, construction of the voltage regulator 170 of FIG. 3 is similar to the voltage regulator of FIG. 2. Accordingly, details relating to similar portions of the voltage regulators may not be restated. The voltage regulator 170 of FIG. 3 may further comprise a negative-channel metal oxide semiconductor (NMOS) transistor 290 to pull up the gate of the output driver 255 and reduce the time to enable the output driver 255. As depicted, the gate of the transistor 290 is coupled to one of the delayed output driver signal p(1) . . . p($n$−1), p(n) thus enabling the transistor 290 after some delay from the driver enable signal DriverEn# being de-asserted. As a result of being enabled, the transistor 290 pulls the output of the operation amplifier 240 up to the suspend mode voltage Vsusp thus increasing the effective slew rate of the operational amplifier 240 and reducing the time for fully enabling the output driver 255.

Figure 4:
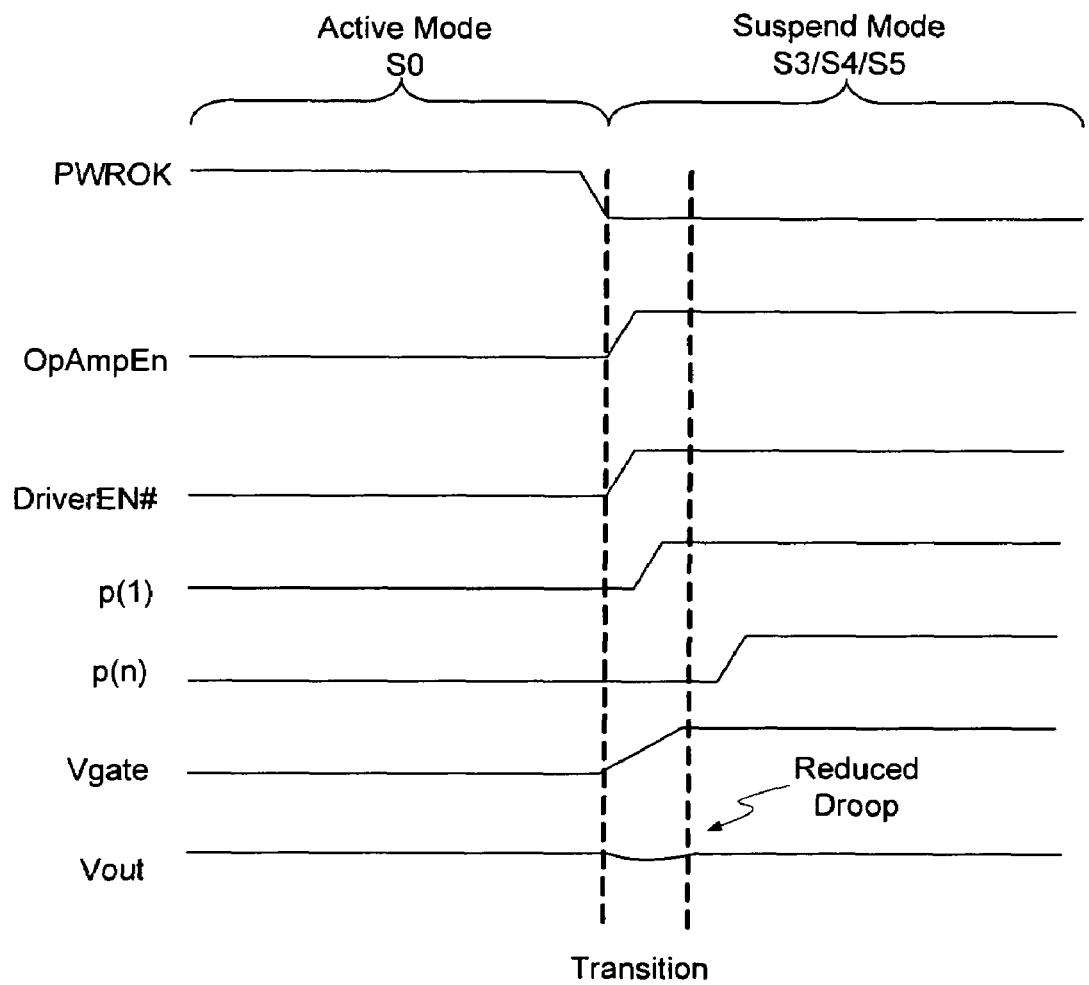
FIG. 4 illustrates waveforms generated by an embodiment of the voltage regulator.

Reference is now made to FIG. 4 which depicts waveforms that may be developed during a transition between active mode and suspend mode. As depicted voltage regulator control 210 may receive power management signal (e.g. PWROK) regarding the transition from active mode to suspend mode. For example, in response to de-assertion of the power management signal PWROK, the control 210 may assert the operational amplifier enable signal OpAmpEn and de-assert the driver enable signal DriverEN#. In such a situation the operational amplifier 240 may cause the output driver 255 of the suspend mode voltage generator 220 to drive the output voltage Vout to the suspend mode voltage Vsusp. Further, the delay elements 280(1) ... 280(m−1), 280(m) may delay the driver enable signal DriverEN# and generate delayed driver enable signals p(1) p(n−1), p(n) that disable the output drivers 270(0) ... 270(n−1), 270(n) in stages thus reducing voltage droop in the output voltage Vout.

Figure 5:
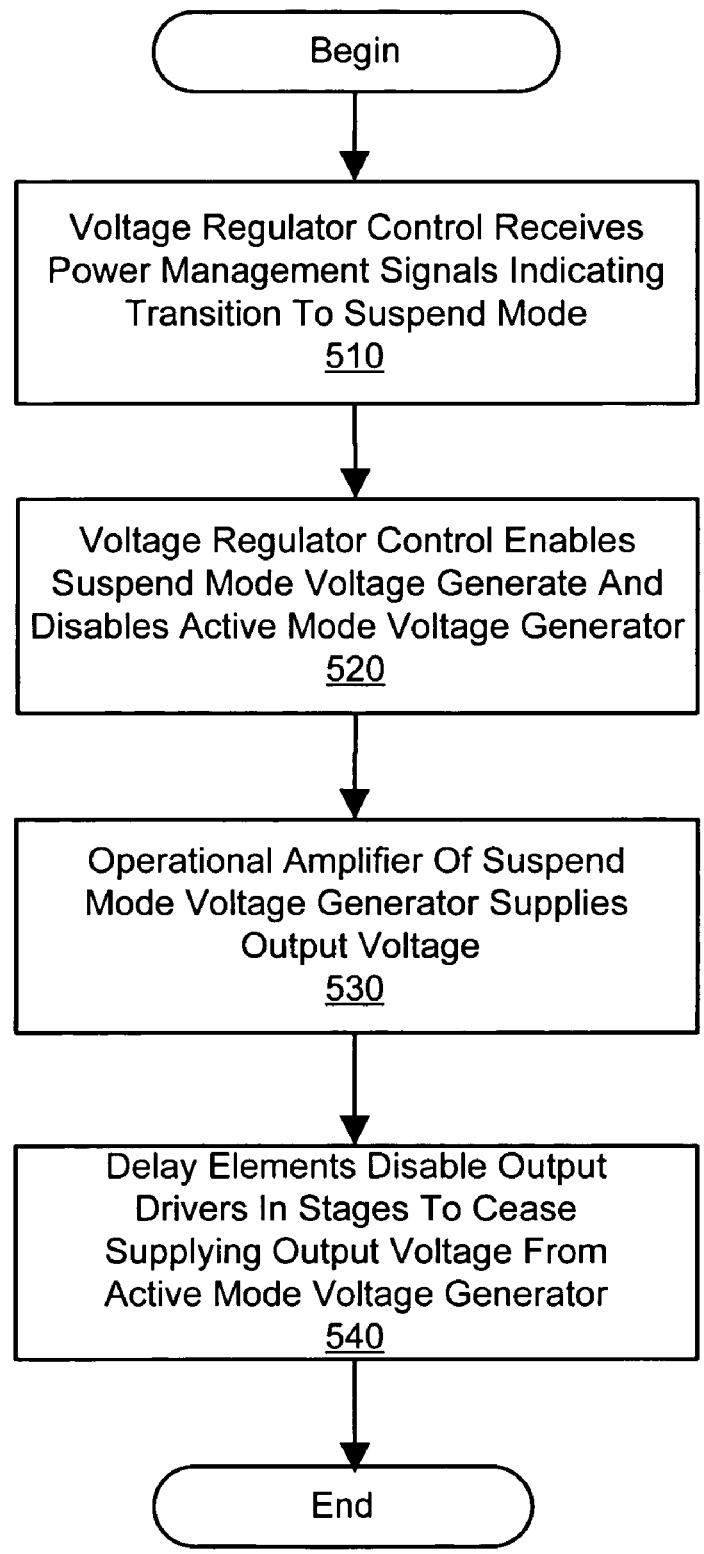
FIG. 5 illustrates a process of an embodiment of the voltage regulator.

Reference is now made to FIG. 5 which depicts an embodiment of a process of the voltage regulator 170. In block 510 a voltage regulator control 210 may receive power management signals that are indicative of a transition from active mode to suspend mode. In response to the power management signals, the voltage regulator control 210 in block 520 may assert an operational amplifier signal OpAmpEn signal to enable a suspend mode voltage generator 220 and may de-assert an output driver enable signal DriverEn# to disable an active mode voltage generator 230. In response to assertion of the operational amplifier enable signal OpAmpEn#, the operational amplifier 240 in block 530 may enable the output driver 255 to cause the suspend mode voltage generator 220 to supply the output voltage Vout.

In response to de-assertion of the output driver enable signal DriverEn#, the delay elements 280(1) ... 280(m−1), 280(m) in block 540 may generate delayed output driver enable signals p(1) ... p(m−1), p(m) that disable the output drivers 270(1) ... 270(n−1), 270(n) in stages. In one embodiment, the delay elements 280(1) ... 280(m−1), 280(m) may disable the output drivers 270(1) ... 270(n−1), 270(n) in stages in an attempt to compensate for a slew rate of the operational amplifier 240.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
in response to a first mode of operation, enabling a plurality of output drivers to supply an output voltage, and
in response to a second mode of operation, enabling an operational amplifier to supply the output voltage, and disabling the plurality of output drivers in a plurality of stages to compensate for a slew rate of the operational amplifier;
wherein disabling the plurality of output drivers comprises disabling one output driver at a time.

2. The method of claim 1 wherein disabling the plurality of output drivers comprises delaying a disable signal a different amount for each of the plurality of stages.

3. The method of claim 1 wherein disabling the plurality of output drivers in a plurality of stages prevents the output voltage from falling below a reset level.

4. The method of claim 1 wherein disabling the plurality of output drivers in a plurality of stages maintains the output voltage at a high logic level during the transition from the first mode of operation to the second mode of operation.

5. The method of claim 1 wherein
the first mode of operation corresponds to an active mode, and
the second mode of operation corresponds to a suspend mode.

6. An apparatus comprising
a suspend mode voltage generator to provide an output voltage in response to being enabled, and
an active mode voltage generator to provide the output voltage in response to being enabled and to compensate for a slew rate of the suspend mode voltage generator in response to being disabled;
wherein the active mode voltage generator comprises
a plurality of output drivers to provide the output voltage in response to being enabled, and
a plurality of delay elements to disable the plurality of output drivers in a plurality of stages.

7. The apparatus of claim 6 further comprising a controller to receive power management signals,
to enable the active mode voltage generator in response to the power management signals indicating an active mode of operation, and
to enable the suspend mode voltage generator and disable the active mode generator in response to the power management signals indicating a suspend mode of operation.

8. The apparatus of claim 6 wherein the plurality of stages equals the plurality of output drivers.

9. The apparatus of claim 6 wherein the plurality of delay elements delay a disable signal a different amount for each of the plurality of stages.

10. The apparatus of claim 6 wherein the active mode voltage generator prevents the output voltage from falling below a reset level during a transition between an active mode of operation and a suspend mode of operation.

11. The apparatus of claim 6 wherein the active mode voltage generator maintains the output voltage at a high logic level during a transition between an active mode of operation and suspend mode of operation.

12. The apparatus of claim 6 wherein the suspend mode voltage generator comprises an operation amplifier to provide the output voltage at the slew rate.

13. The apparatus of claim 12 wherein the suspend mode voltage generator further comprises a transistor between an output of the operational amplifier and a reference voltage to increase the slew rate of the suspend mode voltage generator.

14. A system comprising
a power supply to provide electrical power, and
an integrated circuit comprising a core logic to implement functions of the integrated circuit and a voltage regulator to receive electrical power from the power supply, to provide the core logic with a voltage during an active mode, and to maintain the voltage above a predetermined level during a transition between an active mode and a suspend mode, wherein the voltage regulator comprises a plurality of output drivers to provide the voltage to the core logic during the active mode;
wherein the voltage regulator comprises a plurality of delay elements to disable the plurality of output drivers in a plurality of stages during the transition between the active mode and the suspend mode.

15. The system of claim 14 wherein the plurality of stages equals the plurality of output drivers.

16. The system of claim 14 wherein the voltage regulator maintains the output voltage at a high logic level during the transition between the active mode and the suspend mode.

17. The system of claim 14 wherein the voltage regulator comprises an operation amplifier to provide the output voltage at a slew rate.

18. The system of claim 14 wherein the voltage regulator further comprises a transistor between an output of the operational amplifier and a reference voltage to increase the slew rate of the operational amplifier.

* * * * *